July 26, 1960
H. JÜNGST ET AL
2,946,331
INJECTION CASING FOR INJECTION SYRINGES
Filed Oct. 21, 1957
FIG. 1
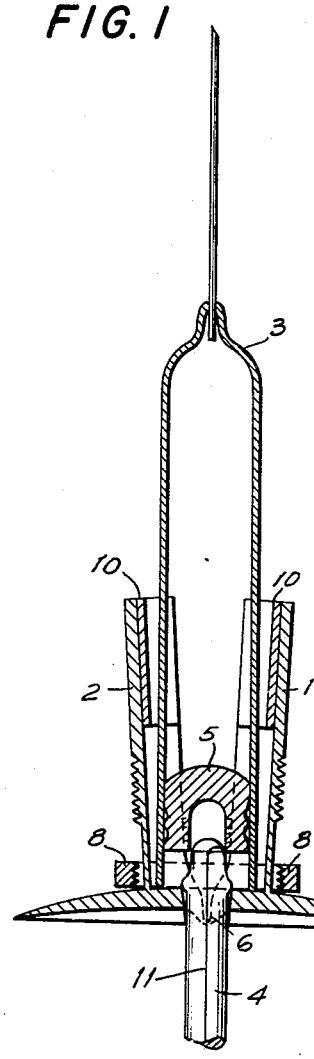
FIG. 2
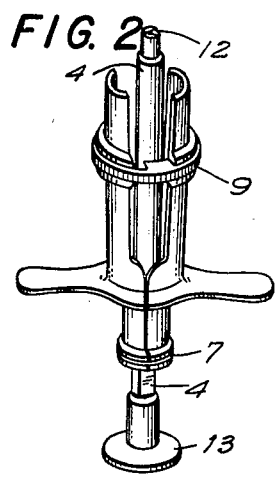
FIG. 3
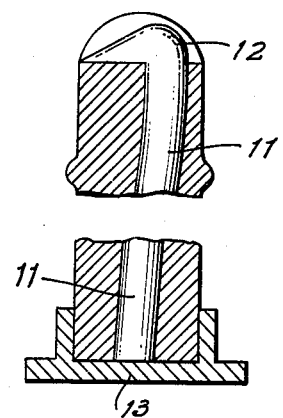
FIG. 4
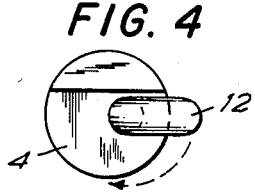
FIG. 5
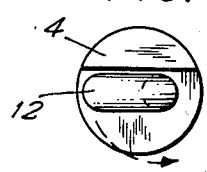
FIG. 7
FIG. 6
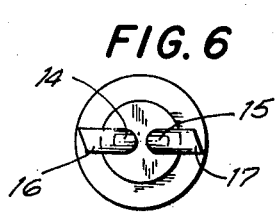
FIG. 8
FIG. 9
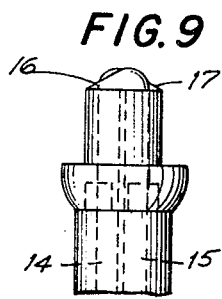
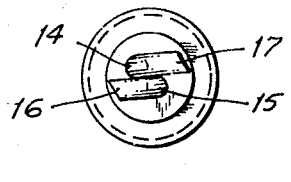
INVENTORS.
HANS JÜNGST
PAUL KÄTSCH
BY Curtis, Morris & Safford
their ATTORNEYS

United States Patent Office 2,946,331
Patented July 26, 1960

2,946,331

INJECTION CASING FOR INJECTION SYRINGES

Hans Jüngst, Kelkheim (Taunus), and Paul Kätsch, Stuttgart, Germany, assignors to Farbwerke Hoechst Aktiengesellschaft vormals Meister Lucius & Bruning, Frankfurt am Main, Germany, a corporation of Germany Filed Oct. 21, 1957, Ser. No. 692,018

2 Claims. (Cl. 128—218)

The present invention relates to syringes and more particularly to a casing for an injection syringe.

The casings used with conventional injection syringes have the disadvantage of only being adapted for syringes of a certain capacity. The use of such injection syringes in medical practice, therefore, is limited to those having a maximum content of, for example, 2 cc. Since certain medicaments are administered in larger single doses, an injection casing permitting the use of injection syringes or cylindrical ampules of any desired capacity would be desirable.

One of the objects of the present invention is to provide a casing adapted for use with injection syringes or ampules of a length and capacity which may vary over wide limits.

Another object is to provide a casing for injection syringes which is of simple and compact construction having a minimum number of parts to adapt it for economical manufacture.

These and other objects will become more apparent from the following description and drawings illustrating casings for injection syringes incorporating the present invention.

In the drawings:

Figure 1 is a longitudinal sectional view of a casing for holding an injection syringe incorporating novel features of the present invention;

Figure 2 is a perspective view of a casing for an injection syringe and showing a clamping means of modified construction;

Figure 3 is an enlarged side elevational view of the plunger and plunger head;

Figures 4 and 5 are plan views of the end of the plunger head showing the different positions of the hooked end of the torsion element.

Figures 6 and 7 are diagrammatic plan and elevational views, respectively, of a plunger and plunger head of further modified construction and showing the hooks at the ends of the torsion elements in extended position; and Figures 8 and 9 are views similar to Figures 6 and 7 showing the hooked ends of the torsion elements in their retracted position.

Figure 1 of the drawings illustrates a casing made in accordance with the present invention for the reception of an ampule 3. The casing has two partly cylindrical jaws 1 and 2 conforming to the cylindrical contour of the ampule 3 and connected by a hinge 6 for movement toward and away from each other. The hinged arrangement of the jaws 1 and 2 is such that they firmly embrace the ampules 3 when the jaws are closed against the sides thereof. A plunger 4 slides in an opening between the two jaws 1 and 2 which together with a hollow stopper 5 in the ampule 3 serves as an injection piston. The jaws 1 and 2 may be spread on hinge 6 in the form of casing illustrated in Figure 1, or by a spring washer 7 in the construction illustrated in Figure 2, to adapt an ampule 3 to be inserted into the casing or, after use, removed therefrom. The spreading of the jaws 1 and 2 can be limited in accordance with requirements by means of a threaded nut 8 cooperating with threaded sections of the jaws 1 and 2 as illustrated in Figure 1, or by an eccentric hoop 9 in the construction illustrated in Figure 2, which operates the jaws to closed position to firmly embrace an ampule 3 therebetween. In the embodiment illustrated in Figure 1, the jaws 1 and 2 have a soft lining 10.

A torsion wire or rod 11 is arranged eccentrically at the head end of plunger 4 extending into a central recess in the stopper 5 and the rod extends lengthwise through the plunger 4. The end portion 12 of the torsion wire 11 is in the form of a hook. When the torsion wire 11 is turned in the plunger 4, the hooked end 12 is moved outwardly beyond the plunger and into the side of the ampule stopper 5 to provide a simple and firm but detachable engagement between the plunger head and the hollow ampule stopper. For the purpose of turning the torsion wire 11, its outer end is attached to a thumb plate 13 at the outer end of the plunger 11. The hooked end portion 12 of the torsion wire rod 11 is illustrated in its extended and retracted positions with respect to the head of the plunger 4 in Figures 4 and 5.

As shown in Figures 6 to 9, it is also possible to provide two torsion wires or rods 14 and 15, arranged eccentrically and extending lengthwise through the plunger 4. Each of the rods 14 and 15 has a hooked end 16 and 17, respectively, adapted to swing out symmetrically upon turning the rods and, thus, engage an ampule stopper 5 at diametrically opposed points. As illustrated in Figure 7, the rods 14 and 15 are turned by a thumb plate 13.

Several forms of casing for injection syringes having now been described in detail, the invention is defined by the following claims.

We claim:

1. A casing of an injection syringe for detachably receiving an ampule of medicament having a hollow stopper comprising, opposed jaws hinged for movement toward and away from the sides of the ampule and having a contour to conform to the sides thereof, a member for operating the hinged jaws toward each other to clamp an ampule therebetween, a plunger movably mounted in the casing between the jaws, and a rod eccentrically mounted in the plunger, said rod having an angularly bent end portion for positioning in the hollow stopper of said ampule to engage the stopper as the eccentric rod is turned in the plunger.

2. A casing for injection syringes in accordance with claim 1 in which an additional rod is arranged eccentrically in the plunger and to extend longitudinally thereof, both said rods having angularly bent ends at the end of the plunger for positioning in the hollow stopper in the ampule and adapted to swing out beyond the plunger head when the rods are turned to engage the stopper.

References Cited in the file of this patent

UNITED STATES PATENTS

| 1,495,924 | Quale | May 27, 1924 |
| 1,667,273 | Stewart | Apr. 24, 1928 |
| 2,660,168 | Pontius | Nov. 24, 1953 |

FOREIGN PATENTS

| 904,292 | France | Feb. 26, 1945 |